United States Patent
Iniesta Ortiz et al.

(10) Patent No.: US 11,052,371 B2
(45) Date of Patent: Jul. 6, 2021

(54) APPLICATION OF ULTRASOUND IN VINIFICATION PROCESSES

(71) Applicant: PRODUCTOS AGROVIN, S.A., Alcazar de San Juan—Ciudad Real (ES)

(72) Inventors: Juan Alberto Iniesta Ortiz, Ciudad Real (ES); Ricardo Jurado Fuentes, Ciudad Real (ES)

(73) Assignee: PRODUCTOS AGROVIN, S.A., Alcazar de San Juan—Ciudad Real (ES)

( * ) Notice: Subject to any disclaimer, the term of this patent is extended or adjusted under 35 U.S.C. 154(b) by 0 days.

(21) Appl. No.: 15/122,810

(22) PCT Filed: Feb. 25, 2015

(86) PCT No.: PCT/ES2015/070130
§ 371 (c)(1),
(2) Date: Aug. 31, 2016

(87) PCT Pub. No.: WO2015/136130
PCT Pub. Date: Sep. 17, 2015

(65) Prior Publication Data
US 2017/0065960 A1 Mar. 9, 2017

(30) Foreign Application Priority Data
Mar. 13, 2014 (ES) ................ ES201430342

(51) Int. Cl.
*C12G 1/02* (2006.01)
*B01J 19/10* (2006.01)
(Continued)

(52) U.S. Cl.
CPC ............... *B01J 19/10* (2013.01); *A23L 5/32* (2016.08); *A23L 19/09* (2016.08);
(Continued)

(58) Field of Classification Search
CPC ..... A23L 2/50; A23L 2/04; A23L 5/30; A23L 19/03; A23L 19/09; A23V 2300/48;
(Continued)

(56) References Cited

U.S. PATENT DOCUMENTS 2,398,440 A * 4/1946 Georges ................... A23N 1/02
100/158 R
2,578,505 A * 12/1951 Benson ............... B01F 11/0241
134/1
(Continued)

FOREIGN PATENT DOCUMENTS

CN 201380070 Y 1/2010
EP 2133137 A2 12/2009
(Continued)

OTHER PUBLICATIONS

L.N. Lieu, et al; Application in ultrasound in grape mash treatment in juice processing; Ultrasonics: Sonochemistry, Butterworth-Heinemann; vol. 17; No. 1; Jan. 2010; pp. 273-279 (not available).
(Continued)

*Primary Examiner* — Drew E Becker
(74) *Attorney, Agent, or Firm* — Lucas & Mercanti, LLP

(57) ABSTRACT

The present invention refers to a method and an equipment for the extraction of compounds from grapes by means of ultrasound in vinification processes generated through a sonoplate coupled to the walls of the pipe/duct through which the crushed grapes flow. During this extraction the transfer of phenols responsible for color from the solid portion (skin) to the liquid portion after crushing the grapes takes place as a consequence of the phenomenon known as cavitation, which allows the breaking of the skin cells and makes the phenolic compounds responsible for the color available to the liquid medium to be integrated in said liquid medium enhancing wine color.

7 Claims, 4 Drawing Sheets

(51) Int. Cl.
*B01J 19/24* (2006.01)
*A23L 5/30* (2016.01)
*A23L 19/00* (2016.01)
*C12G 3/08* (2006.01)
*C12G 1/032* (2006.01)

(52) U.S. Cl.
CPC ............ *B01J 19/2415* (2013.01); *C12G 1/02* (2013.01); *C12G 1/0216* (2013.01); *C12G 3/08* (2013.01); *A23V 2200/044* (2013.01); *A23V 2300/48* (2013.01); *B01J 2219/0879* (2013.01); *B01J 2219/192* (2013.01)

(58) Field of Classification Search
CPC . A23V 2300/14; A23N 1/00–02; B01J 19/10; B01J 2219/0879; B01J 2219/192; C12G 1/02
USPC .............. 426/11, 15, 238, 425–437, 599
See application file for complete search history.

(56) References Cited

U.S. PATENT DOCUMENTS

| | | | | |
|---|---|---|---|---|
| 2,585,103 | A * | 2/1952 | Fitzgerald | B01J 19/10 159/900 |
| 2,903,372 | A * | 9/1959 | Walker | A23L 5/32 204/157.15 |
| 2,949,364 | A * | 8/1960 | Bilenker | A23F 5/265 422/128 |
| 3,667,967 | A * | 6/1972 | Coltart et al. | A23L 2/04 426/238 |
| 3,867,929 | A * | 2/1975 | Joyner | A61H 23/0245 601/166 |
| 4,071,225 | A | 1/1978 | Holl | |
| 4,708,878 | A * | 11/1987 | Hagelauer | A23L 3/005 426/231 |
| 5,110,472 | A * | 5/1992 | Gresch | A23N 1/02 210/259 |
| 5,498,431 | A * | 3/1996 | Lindner | B01J 19/10 422/20 |
| 5,611,993 | A * | 3/1997 | Babaev | A61L 2/025 204/158.2 |
| 5,658,534 | A * | 8/1997 | Desborough | B01J 19/10 204/157.15 |
| 7,354,556 | B2 * | 4/2008 | Perkins | B01J 19/10 210/748.02 |
| 2005/0008739 | A1 * | 1/2005 | Talukdar | C02F 1/36 426/238 |
| 2006/0204624 | A1 * | 9/2006 | Patist | B01D 9/004 426/283 |
| 2008/0312460 | A1 | 12/2008 | Goodson | |
| 2009/0130269 | A1 * | 5/2009 | McCausland | A23G 3/26 426/238 |
| 2010/0015302 | A1 * | 1/2010 | Bates | A23F 3/18 426/238 |
| 2011/0278153 | A1 | 11/2011 | Bates et al. | |
| 2013/0059043 | A1 * | 3/2013 | Hielscher | C12J 1/00 426/238 |
| 2013/0101710 | A1 * | 4/2013 | Ha'Eri | A47J 31/00 426/238 |
| 2013/0180165 | A1 | 7/2013 | Brasil | |
| 2013/0323372 | A1 * | 12/2013 | Msika | B01D 11/0211 426/239 |
| 2013/0330454 | A1 * | 12/2013 | Mahamuni | C12H 1/14 426/238 |
| 2014/0272929 | A1 * | 9/2014 | Puskas | C12N 1/066 435/5 |
| 2015/0359247 | A1 * | 12/2015 | Puskas | C12G 1/02 426/15 |

FOREIGN PATENT DOCUMENTS

| | | | | |
|---|---|---|---|---|
| FR | 3051101 A1 * | 11/2017 | | A23N 1/00 |
| JP | 2001258540 A * | 9/2001 | | |
| RU | 2104733 C1 | 2/1998 | | |
| WO | 00/35579 A1 | 6/2000 | | |
| WO | WO-2005042178 A1 * | 5/2005 | | A61L 2/025 |
| WO | 2006099411 A1 | 9/2006 | | |
| WO | 2008074072 A1 | 6/2008 | | |

OTHER PUBLICATIONS

International Search Report dated Jun. 24, 2015 for PCT/ES2015/070130.
Written Opinion dated Jun. 24, 2015 for PCT/ES2015/070130.
L.N. Lieu, et al; Application of ultrasound in grape mash treatment in juice processing; Ultrasonics Sonochemistry, Butterworth-Heinemann; vol. 17; No. 1; Jan. 2010; pp. 273-279.
R.M. Aadil, et al; Effects of ultrasound treatments on quality of grapefruit juice; Food Chemistry; vol. 141; 2013; pp. 3201-3206.
K. Vilkhu, et al; Applications and opportunities for ultrasound assisted extraction . . . ; ScienceDirect; Innovative Food Science and Emerging Technologies; vol. 9; 2008; pp. 161-169.
S.R. Shirsath, et al; Intensification of extraction of natural products using ultrasonic irradiations . . . ; Chemical Engineering and Processing: Process Intensification; vol. 53; 2012; pp. 10-23.
M. Vinatoru; An overview of the ultrasonically assisted extraction of bioactive principles from herbs; Ultrasonics Sonochemistry; vol. 8; 2001; pp. 303-313.
Prior Art Report dated Jul. 9, 2014 for corresponding Spanish Application No. 201430342 (Spanish only).

* cited by examiner

APPLICATION OF ULTRASOUND IN VINIFICATION PROCESSES

CROSS REFERENCE TO RELATED APPLICATION

This Application is a 371 of PCT/ES2015/070130 filed on Feb. 25, 2015, which claims priority of Spanish Application No. P201430342 filed Mar. 13, 2014, both of which are incorporated herein by reference.

OBJECT OF THE INVENTION

The present invention refers to a method, a module and an equipment for the extraction of compounds from grapes by means of ultrasound in vinification processes.

In particular, the invention refers to transferring the phenolic compounds responsible for the color from the skin to the liquid portion (must) after crushing the grapes using for this a method and an equipment based on ultrasound generation.

More particularly, the invention refers to the generation, by using ultrasound, of the phenomenon known as cavitation, which allows the breaking of the skin cells and makes the phenolic compounds responsible for the color available to the liquid medium to be integrated in said liquid medium enhancing wine color.

BACKGROUND OF THE INVENTION

The color of wine is one of the organoleptic parameters most valued by the consumer as it provides information about its vinification, evolution and defects it may have. With the passage of time and due to oxidation processes, white wines evolve into duller hues such as golden yellow. The same applies to rosé and red wines, the vividness of the colors decreases over time.

Color is of special interest in red and rosé wines, due to the economic resources that must be used to extract the phenolic fraction of the skin, where phenolic compounds, those responsible for coloring, are stored. These substances affect not only the color but also contribute to the tasting phase or flavor (aroma, flavor and astringency) and also affect the aftertaste or body.

Heterogeneous substances are grouped under the name of phenolic compounds classified as follows:
Non-Flavinoid: stilbenes and phenolic acids.
Flavinoid: anthocyanins, flavanols, flavonols, flavononols and flavones.

Amongst these, the compounds that influence the color of red and rosé wines the most resulting in orange, red, purple or blue colors are anthocyanins and the pigments derived from them, produced by copigmentation or condensation processes.

The transfer of phenolic compounds responsible for the color from the skin into the liquid phase (must) after a crushing process, is closely related to the raw material and vinification techniques employed and the variety, ripeness and size of the grape affects it decisively.

The traditional maceration process or Bordeaux, starts when the grapes are crushed, but is especially effective when the alcoholic fermentation begins. After barreling and subsequent inoculation, overpumping and pigeage are necessary such that the solid part located at the top of the tank forming the hat comes into contact with the must, increasing its color.

The wines produced by this process are characterized as having recognized quality. However, a large financial investment is required for the acquisition of fitted tanks, enough space for installation thereof, personnel in charge of the process, etc. in order to carry out the traditional maceration. Furthermore, to achieve a good product maceration has to be developed for several days, a period of time that sometimes the winery does not have due to mechanization in grape harvesting.

There are alternative methods which aim to improve the yield of maceration, which means causing the rapid extraction of phenolic compounds responsible for the color dramatically increasing temperature, as is the case of "flash expansion" fermentation maceration or "thermovinification", or otherwise removing the coloring matter slowly because the paste remains at temperatures below 10° C., a process known as "criomaceration".

The process known as "flash expansion" consists of subjecting the produced crushed grapes (grape paste) to temperatures of up to 90° C. to be subsequently placed under vacuum. This together with rapid cooling (90° C. to 30° C. in approximately 1 sec) causes disruption of the tissues of the grape producing transfer of compounds to the must. The flash equipment is very expensive in addition to the energy costs involved in the production of heat and cold. Organoleptically, the loss of aromas is a reality. As a consequence of heating, cooked aromas occur due to an increase of compounds such as Hydroxymethylfurfural (HMF), among others.

"Thermovinification" consists of heating the whole or processed bunches before alcoholic fermentation to extract their entire polyphenolic potential. Once the grape harvest has been subjected to high temperatures, the color will continue to be extracted during alcoholic fermentation, since the skins will remain in contact with the must-wine. The same as the previous technique, "thermovinification" is a continuous process, increases the yield of red grape harvest and saves on tank capacity.

In general, wines produced with thermovinification are intended for mixing with wines with better organoleptic quality but that have lower color intensity. These are wines where herbaceous, scorched, and aggressive aromas without freshness occur. The economic investment required is high.

As for "criomaceration", destemmed and crushed grapes are subjected for long periods of time, about 10 days, to a temperature of 5 to 10° C. The skins will slowly transmit phenolic compounds. The disadvantages of this technique are that it is not a continuous process, where the cooled harvest is stored for a period of time before being fermented. This requires that the cellars are designed so that they can store large volumes of both raw material and in-process product.

Continuous processes for extracting components from solid materials by application of ultrasound are also known, although these are not specific of vinification processes. All of these are based on the use of "bar" type transducers, also called sonotrodes, as pingers; which sonotrodes are also immersed in the product to be treated.

Thus, for example, patent application WO 2008/074072 describes an extraction process in which the product to be treated flows around a sonotrode emitting high energy and low frequency ultrasonic waves (LFHP-US). Moreover, in this patent application the use of low frequency/high energy ultrasound is combined with heating of the product under treatment for extraction of components. As an example, the method used for the extraction of color from red table grapes is described, which is not a vinification process, since vinification of table grapes is absolutely prohibited, such and as reflected in COUNCIL REGULATION (EC) No 479/2008, of 29 Apr. 2008 on the common organization of the market in wine.

On the other hand, patent application WO 2006/099411 describes a process of peel oil extraction from citrus fruit, wherein the product to be processed (mixture of water and citrus peels) flows around a sonotrode immersed in said product, emitting high energy ultrasonic waves.

Also, Russian Patent RU 2 104 733 C1 includes the possibility of carrying out the extraction of solid materials from vegetable raw materials dissolved in ethanol, using a sonotrode immersed in said alcoholic solution. Said vegetable raw materials are: ginseng, flowers and fruits of hawthorn, *hypericum* and aceria leonuri.

However, these processes characterized by using a sonotrode immersed in the liquid phase have the problem that the performance of the sonotrodes is less than 80%. Performance means the ratio between the electrical energy consumed and the production of ultrasonic waves, expressed in %. In the case of the sonotrodes, the transducer uses only 80% of the electrical energy received by the generator in the production of ultrasonic waves, and the remaining 20% is used to produce heat.

Another drawback of sonotrodes is that they emit a large amount of heat during the treatment, and since they are immersed and in contact with the product to be treated, the heating of said liquid phase is produced which may lead to formation of hydroxymethylfurfural (HMF). HMF is a cyclic aldehyde which is formed by the degradation of sugars, mainly by dehydration of fructose and glucose in an acid medium, especially when the temperature is raised for short periods of time. According to the experiments carried out in freshly prepared grape musts, when steadily subjected to temperatures of 65° C. for a minimum of 30 minutes, the HMF concentration starts to increase in an accelerated manner. If the temperature is increased, the HMF production time is drastically reduced, producing concentrations above 25 mg/Kg in several minutes.

An increase in the HMF concentration in the must which will be subsequently fermented produces undesirable scorched or toasted aromas. But the harmful effects it has on the health of certain rodents are even more worrying, since according to research conducted (1) Zhang, X. M.; Chan, C. C.; Stamp, D.; Minkin, S.; Archer, M. C.; Bruce, W. R. Initiation and promotion of colonic aberrant crypt foci in rats by 5-hydroxymethyl-2-furaldehyde in thermolyzed sucrose. *Carcinog.* 1993, 14, 773-775; 2) Bakhiya, N.; Monien, B.; Frank, H.; Seidel, A.; Glatt, G. Renal organic anion transporters OAT1 and OAT3 mediate the cellular accumulation of 5-sulfooxymethylfurfural, a reactive, nephrotoxic metabolite of the Maillard product 5-hydroxymethylfurfural. *Biochem. Pharmacol.* 2009, 78, 414-419, HMF is initiator and promoter of colon cancer, nephrotoxic processes and chromosomal aberrations. However, the greatest concern about the risk of this molecule is associated to the conversion of HMF to SMF (5-Sulfooxymethylfurfural) due to the mutagenic nature of the latter (EFSA, 2005. Opinion of the scientific panel on food additives, flavourings, processing aids and materials in contact with food (AFC) on a request from the commission related to flavouring group evaluation 13: furfuryl and furan derivatives with and without additional side-chain substituents and heteroatoms from chemical group 14. EFSA Journal, 2005a, 215, 1-73.). In humans, toxicity of HMF and its derivatives is more pronounced.

Another problem with the electrodes immersed in the product to be processed due to the radial outward emission and despite being LFHP-US, is that the crushed grapes can buffer the ultrasound wave over distances of a few cm, which reduces the effectiveness of the process.

DESCRIPTION OF THE INVENTION

It is an object of the present invention to provide a method, a module and an equipment for the extraction of compounds from grapes by means of ultrasound in vinification processes which can be carried out continuously, with or without recirculation, with high efficiency and avoiding undesired effects.

Another object of the present invention is to overcome existing problems in the state of the prior art.

Other objects and additional advantages of the present invention are derived from the description made below, taking into account the enclosed figures and the example of preferred embodiment described by way of illustration but without limitation.

The transducers used in the method and installed in the module and in the equipment are of "plate" type, also referred to as sonoplates, more specifically piezoceramic or magnetostrictive type sonoplates, depending on the desired application, since magnetostrictive sonoplates have a larger power/area coefficient than piezoceramic sonoplates.

These are placed around a conduit, preferably a pipe narrowed at its ends, through which the crushed grapes flow coinciding with the sides of the polygon.

Plate type transducers are coupled to the conduit on the outside thereof, so they are not in direct contact with the raw material to be treated.

In terms of yield, plate transducers or sonoplates are differentiated from bar transducers or sonotrodes by having a higher yield of around 95%. By contrast, sonotrodes are less effective having lower yields of 80%. Despite this, sonoplates produce less heat energy than sonotrodes; therefore sonoplate components suffer less, thus being more robust in industrial applications.

Each sonoplate will be able to develop a power that will range from 100 to 5,000 W. The number of sonoplates per module will vary to achieve energy intensity or power density between 0.1 W/cm$^3$-500 W/cm$^3$, preferably between 0.15 W/cm$^3$ to 200 W/cm$^3$. The amplitude of the ultrasonic wave will range between 1-100 μm.

The sonoplates are arranged in modules. The power developed per ultrasound module is comprised between 2 kW-10 kW, developing a power density which can vary between 0.1 W/cm$^3$-500 W/cm$^3$, preferably between 0.15 W/cm$^3$ to 200 W/cm$^3$. The length of each ultrasound module will vary according to the volume to be processed, ranging from 0.8 meters to 10 meters.

Each ultrasound module comprises at least one sonoplate, at least one generator responsible for receiving the electrical energy and transmitting it to the sonoplate where it is transformed into vibrating mechanical energy, which is transmitted to the crushed grapes, a polygonal pipe narrowed at its ends through which crushed grapes flow and in which the sonoplates and a structure surrounding the pipe are coupled, acting as a protective and soundproof.

The ultrasound equipment is formed by at least one ultrasound module, pump, valves, solenoid valves, fittings and all the materials needed to establish a closed circuit between the tank that stores crushed grapes and the ultrasound equipment. Control of the different components of the equipment may be made through a control box of "control panel" type or "PLC computer"; the operation can be performed in manual or automatic mode.

The present invention uses low frequencies to produce a more efficient extraction. The working frequency range is between 15 and 35 kHz, preferably, between 20 and 30 kHz; more preferably, between 22 kHz, and 25 kHz.

The extraction of compounds from grapes, especially those that give color to the must/wine, is carried out dynamically by passing a variable flow rate of between 1,000 and 50,000 l/h of crushed grapes through the ultrasound equipment. In order to effectively control the flow rate at which the crushed grapes flow, a flow meter can be installed at the end of the equipment.

In those processes in which the grape crusher does not produce a suitable liquid phase (must), installing a shredder before the ultrasound equipment will be required.

The liquid fraction is very important, since the proper performance of the cavitation process depends on it. Cavitation consists of the systematic production of small bubbles that tend to collide with each other and release their energy. Said aggressive bubble collision together with the associated implosion process generates wear of the skin tissue containing the phenolic compounds, these passing to the liquid fraction. Due to the cavitation process, there is an increase of temperature of the crushed grapes being treated. The use of plate type transducers ensures that the temperature of the process does not rise above 50° C. thus preventing the formation of hydroxymethylfurfural (HMF).

The installation of plate type transducers reduces the production of heat energy since 95% of the electrical energy received by the transducer is converted into acoustic energy, and only the remaining 5% is transformed into heat. Therefore, the heat produced during the treatment is the sum of the heat energy emitted during cavitation plus 5% of heat produced directly by the sonoplate.

In the case of bar type transducers or sonotrode, heat production is higher because only 80% of the electrical energy is converted into acoustic energy and the remaining 20% is converted into heat.

Since the sonotrode is immersed in the product under treatment, the heat produced by cavitation plus the heat generated by the sonotrode itself impact on the performance thereof; therefore the generator that supplies electrical energy to the plate transducer in the presence of an increase in temperature, as a safety measure, reduces the power, resulting in a decrease in the production of ultrasonic waves, and therefore, a less effective cavitation.

In those grape harvests where the ripening is poor or for those varieties that contain fewer amounts of phenolic compounds in the skin, treatments are longer. Because of this time increase, the temperature of the crushed grapes under treatment will increase with the consequent production of HMF. It is for this reason that the installation of a cold exchanger is necessary in these cases to ensure low or no HMF production.

DESCRIPTION OF THE FIGURES

To complement the description being carried out and with the object of helping to a perfect understanding of the present invention, a set of drawings is attached as an integral part of said description, which by way of illustration and without limitation, represent the following.

DESCRIPTION OF A PREFERRED EMBODIMENT

By way of example of embodiment, and by way of illustration and without limitation, a method, a module and an equipment for the extraction of compounds from grapes by means of ultrasound in vinification processes are described below.

Figure 1:
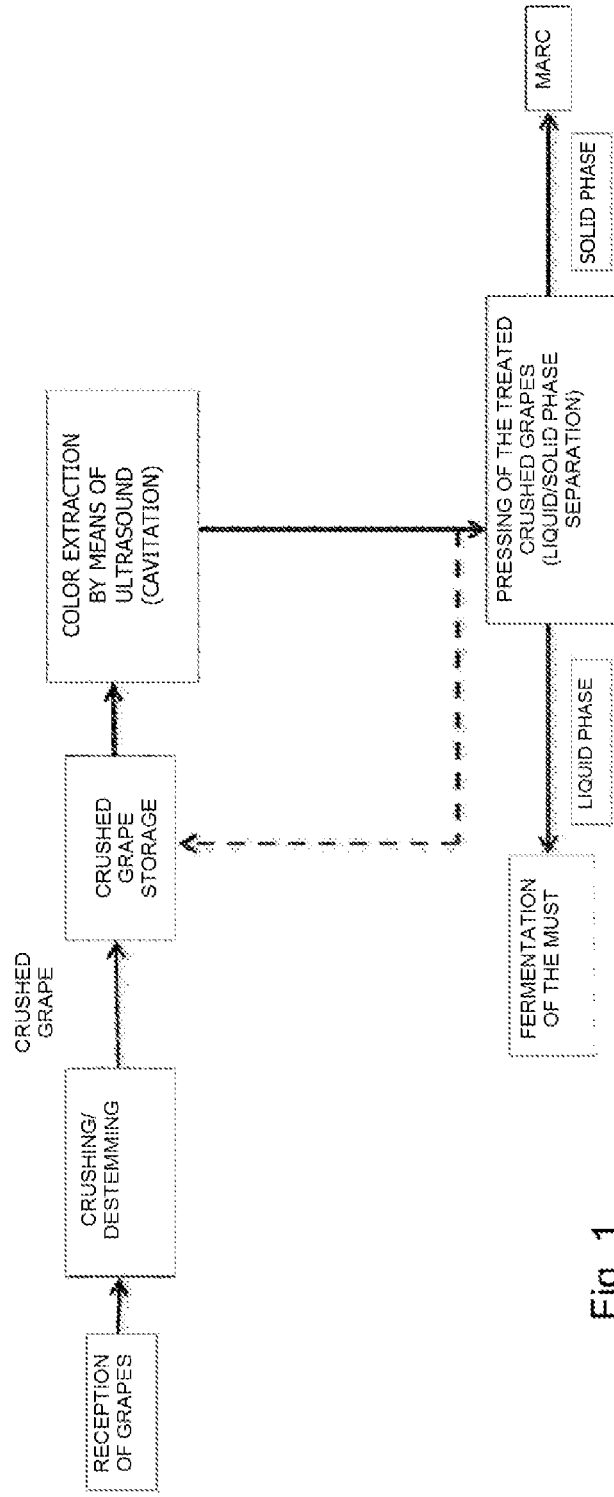
FIG. 1: Block diagram of a vinification process according to the invention

As seen in FIG. 1 a vinification process starts with the reception of the grapes and subsequent crushing thereof; the destemming can be performed simultaneously with the crushing.

The crushed grapes pass to a tank or storage for the product under treatment. This tank allows in addition to said storage, the operation in recirculation of the paste. The paste passes from the tank to the treatment for color extraction by means of ultrasound (cavitation).

Once the color extraction is finished, the paste treated with ultrasound is subjected to pressing for the separation between liquid and solid phases, where the liquid phase (must) is taken to fermentation and the solid phase (pomace) is obtained as a residue which can be used to obtain related products.

Figure 2:
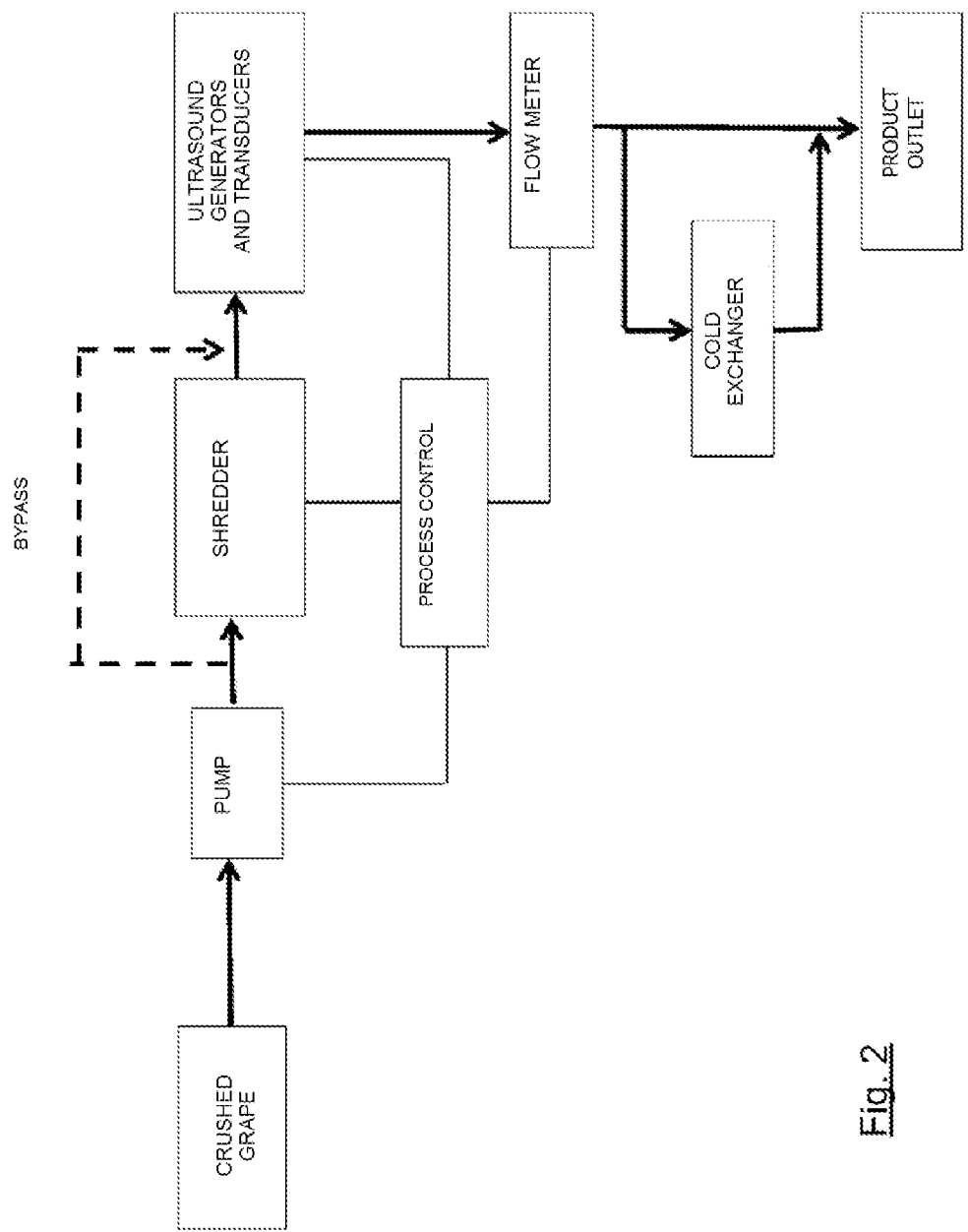
FIG. 2: General scheme of an ultrasound equipment according to the invention

FIG. 2 depicts a general scheme of ultrasound equipment according to the invention that begins by pumping the product under treatment from the tank or storage. Then, and optionally, the paste can pass through a shredder or go directly to the area of treatment with ultrasound, the flow being controlled by a flow meter and, also optionally, cooling the paste if necessary.

The different parts of the ultrasound equipment can be controlled by a PLC type control process or similar.

Figure 3:
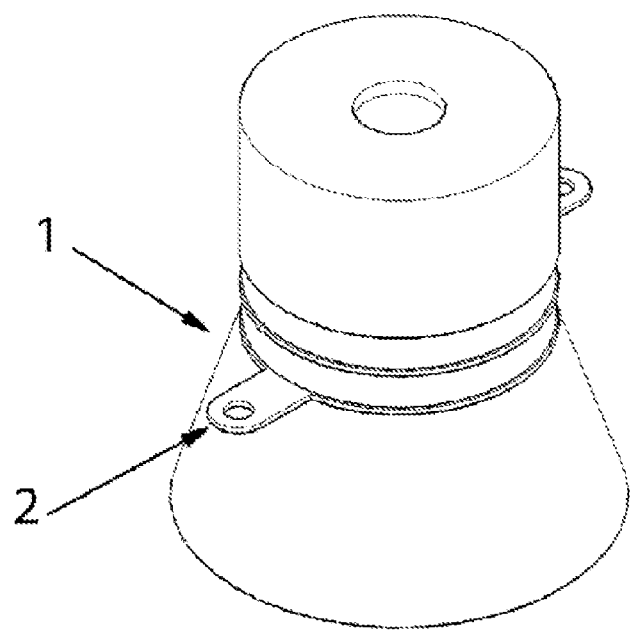
FIG. 3: Sonoplate used in the method and equipment according to the invention.
Figure 4:
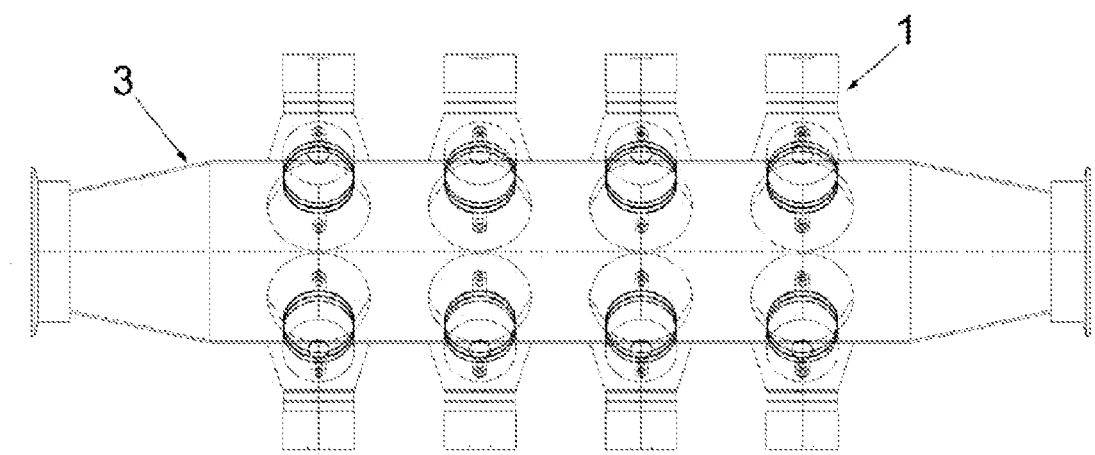
FIG. 4: Ultrasound module according to the invention.

In an ultrasound module according to the invention, carried out by way of example, the plate type transducers or sonoplates 1 are of piezoceramic type. These are shown in FIG. 3. The sonoplates are connected to each other and to the generator, through terminals 2.

The ceramics comprising the piezoceramic type transducer have the piezoelectric effect when its surfaces are deformed by applying electric current to it, producing the acoustic wave. However, magnetostrictive type transducers are characterized by being composed of ferromagnetic materials; if the magnetization of a material of this type is varied the corresponding mechanical deformation develops, and thereby the acoustic wave is produced. The composition of both types of transducers also varies, the most commonly used material being PZT (lead zirconate titanate), although it is not the only one, while the magnetostrictive transducers are composed mainly of Terfenol-D (Ter=Terbium, Fe=Iron, NOL=Naval Ordenance Laboratory, D=Dysprosium).

These are positioned around a conduit formed by a hexagonal stainless steel pipe with a thickness of 1-8 mm comprising a narrowing at its ends.

The plate type transducers are welded to the hexagonal stainless steel pipe, but they are not in direct contact with the raw material to be treated.

Each ultrasound module 3 consists of at least one sonoplate 1, at least one generator responsible for receiving the electrical energy and transmitting it to the sonoplate where it is transformed into vibrating mechanical energy, which is transmitted to the crushed grapes, an hexagonal pipe narrowed at its ends, through which the crushed grapes (paste)

moves and in which the sonoplates and a structure surrounding the pipe are coupled, acting as a protective and soundproof.

Figure 5:
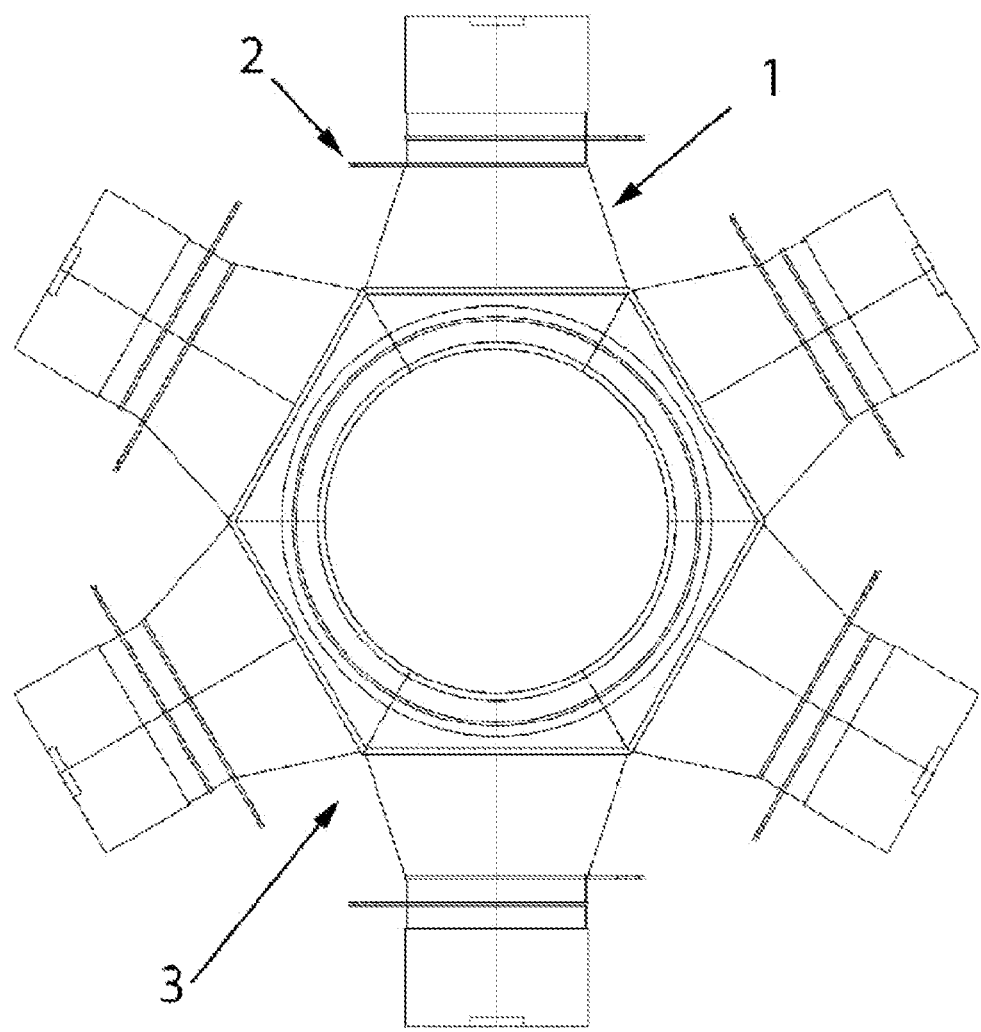
FIG. 5: Section of an ultrasound module according to the invention.

As seen in FIG. 5, in this example of embodiment, the number of sonoplates 1 per module 3 is four on each side of the polygon, that is, twenty four sonoplates 1 per module 3.

The invention claimed is:

1. A method of using ultrasound energy to extract compounds from crushed grapes during vinification, the method comprising:
performing, by an apparatus, a plurality of steps as part of a vinification method that includes fermentation,
wherein the apparatus comprises:
a storage configured to hold crushed grapes;
an ultrasound equipment comprising at least one ultrasound module, the ultrasound module comprising:
a conduit configured to carry a continuous flow of crushed grapes; and
at least one sonoplate coupled to one or more external surfaces of the conduit, the at least one sonoplate configured to transmit ultrasound energy through one or more walls of the conduit to the crushed grapes in the conduit, without contact between the crushed grapes and the at least one sonoplate;
wherein
the at least one sonoplate develops a power between 100 to 5,000 W; and
the energy intensity or power density of ultrasound energy transmitted by the at least one sonoplate is between 0.15 W/cm3 and 200 W/cm3;
a closed circuit between the storage and the ultrasound equipment, the closed circuit configured to carry crushed grapes between the storage and the ultrasound equipment;
a pump configured to cause a continuous flow of crushed grapes through the conduit with or without recirculation; and
a generator configured to provide power to the at least one sonoplate, the generator further configured to reduce the power provided to the at least one sonoplate in response to an increase in a temperature;
the plurality of steps comprising:
prior to fermentation of the crushed grapes, causing, by the pump, the crushed grapes to flow continuously through the conduit; and
prior to fermentation, transmitting, by the at least one sonoplate, ultrasound energy through the one or more walls of the conduit to the crushed grapes, without contact between the crushed grapes and the at least one sonoplate, while maintaining a temperature of the crushed grapes at all times during transmission of the ultrasound energy equal to or less than 50° C.;
wherein hydroxymethylfurfural is not formed during transmission of the ultrasound energy by the at least one sonoplate through the one or more walls of the conduit to the flowing crushed grapes.

2. The method according to claim 1, wherein the at least one sonoplate is of a piezoceramic type or a magnetostrictive type.

3. The method according to claim 1, wherein a range of working frequencies of the at least one sonoplate is between 15 and 35 kHz.

4. The method according to claim 3, wherein the range of working frequencies of the at least one sonoplate is between 20 and 30 kHz.

5. The method according to claim 3, wherein the range of working frequencies of the at least one sonoplate is between 22 kHz and 25 kHz.

6. The method according to claim 1, wherein the crushed grapes continuously flow through the conduit at a working flow rate between 1,000 and 50,000 l/h.

7. The method according to claim 1, wherein the ultrasound energy comprises ultrasonic waves having an amplitude between 1 and 100 µm.

* * * * *